United States Patent Office 3,336,197
Patented Aug. 15, 1967

3,336,197
PHENOTHIAZINE DERIVATIVE
Jany Renz and Jean-Pierre Bourquin, Basel, Guido Gamboni, Allschwil, and Gustav Schwarb, Neuallschwil, Switzerland, assignors to Sandoz Ltd. (also known as Sandoz A.G.), Basel, Switzerland
No Drawing. Filed Dec. 23, 1964, Ser. No. 420,821
Claims priority, application Switzerland, Apr. 19, 1956, 32,347/56; May 25, 1956, 33,613/56; July 26, 1956, 35,890/56; Nov. 22, 1956, 39,885/56; Dec. 20, 1956, 40,904/56; Jan. 29, 1957, 42,111/57; Feb. 1, 1957, 42,255/57; Feb. 22, 1957, 43,017/57; Mar. 8, 1957, 43,663/57; Apr. 8, 1957, 44,765/57; Apr. 17, 1957, 45,144/57; May 29, 1957, 46,703/57; Dec. 18, 1957, 53,884/57
4 Claims. (Cl. 167—65)

This application is a continuation-in-part application of our co-pending application Ser. No. 88,017, filed Feb. 9, 1961, now abandoned, which in turn was a continuation in part application of our pending application Ser. No. 653,058, now Patent No. 3,239,514 and application Ser. No. 719,507 now abandoned.

This invention relates to a therapeutically useful phenothiazine derivative and its physiologically acceptable acid addition salts.

The present invention provides 3-ethylmercapto-10-[3'-(1''-methyl-piperazyl-4'')-propyl-1']-phenothiazine of the formula,

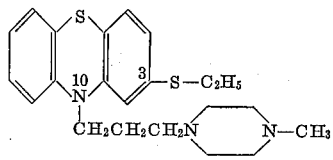

and its physiologically acceptable acid addition salts.

The present invention further provides a process for the production of the Compound I and its acid addition salts which comprises (a) condensing 3-ethylmercapto-phenothiazine of the formula,

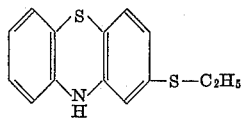

with a compound of the formula,

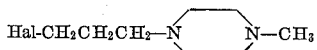

wherein Hal signifies chlorine or bromine or (b) reacting a phenothiazine derivative of the formula,

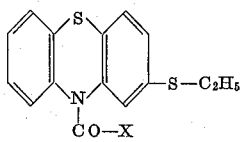

wherein X stands for Cl, Br, or I, with the amino-alcohol of the formula,

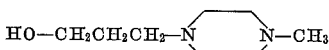

thereby yielding a compound of the formula,

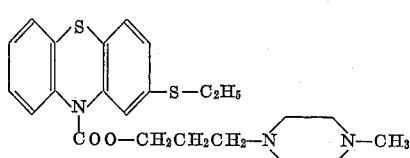

and then splitting $CO_2$ off from the latter, and, when a physiologically acceptable acid addition salt is desired, salifying with a suitable organic or inorganic acid.

In carrying out the first aforementioned process embodiment of the present invention, the 3-ethylmercapto-phenothiazine (II) is dissolved in a suitable organic solvent, such as, for example, benzene, toluene, xylene, dichlorobenzene, nitrobenzene, etc., and reacted at elevated temperature with a 1-(1'-methyl-piperazyl-4')-propyl halogenide-3 of Formula III in the presence of an alkaline condensing agent, e.g. sodium amide.

The reaction may also be carried out in the absence of a solvent by fusing the reaction partners together, and the condensing agent may also be omitted, although this may reduce the yield.

Upon completion of the reaction, the reaction mixture is shaken with water, the newly-formed reaction product I extracted from the reaction mixture by means of dilute mineral or organic acid, and then precipitated from the aqueous phase by the addition of caustic alkali. The so-precipitated oily base is taken up in benzene or another water immiscible solvent and is then again freed from the solvent by evaporation. The obtained base can be purified by distillation in a high vacuum, and then converted into a suitable salt with an inorganic or organic acid.

In carrying out the second aforementioned process embodiment of the present invention, a 3-ethylmercapto-phenothiazine-10-carboxylic acid halide of Formula IV is dissolved in an appropriate solvent such for example as benzene, toluene, xylene, dichlorobenzene, nitrobenzene, etc., and is then reacted with the amino-alcohol of Formula V, if desired, in solution in one of the said solvents, at room temperature or at elevated temperature, the resultant reaction product of formula VI being isolated from the reaction mixture.

The so-obtained 3-ethylmercapto-phenothiazine-10-carboxylic acid ester (VI) is then heated to 150–220° C., whereby carbon dioxide is split off. If desired, this reaction can be carried out in a suitable solvent such for example as dichlorobenzene or nitrobenzene. Upon completion of the decarboxylation, the newly formed phenothiazine derivative (I) is isolated and, if desired, converted into a salt.

Compounds which are chemically similar to the Compound I are known. Thus, for example, the Luxembourg Patent No. 34,733 inter alia describes 3-methylmercapto-10 - [3' - (1'' - methyl - piperazyl - 4'') - propyl-1']-phenothiazine a compound which differs from the compound I chemically in that it is substituted by a methylmercapto radical rather than an ethylmercapto radical in the 3 position. At the time of filing the original application, on which the present application is based, it was generally contended and accepted that the 3-methylmercapto compounds of the type in question were far more active than the corresponding 3-ethylmercapto compounds. This contention does in fact hold true for all compounds of this type and for all activities excepting the anti-emetic activity.

It was thus surprisingly and, in view of all the prior art, most unexpectedly found that the 3-ethylmercapto compound of the present invention exhibited not only a considerably stronger anti-emetic action than the corresponding 3-methylmercapto compound, but also exhibited a very selective activity, enfolding virtually no sedative or cataleptic action.

Thus, it is that the compound of the invention is a highly effective anti-emetic, anti-nauseant and anti-vertigo agent having a wide safety factor and being practically free from tranquilizing, atoractic, sedative and hypotensive side effects. It can be used either prophylactically or therapeutically. Moreover, the compound of the invention has been found to be effective in cases of radiation and X-ray sicknesses and the nausea and vomiting resulting from surgical procedures and anesthetics.

The compound of the invention forms a variety of stable crystalline salts with physiologically tolerable inorganic and organic acids, e.g., with hydrochloric acid, hydrobromic acid, hydriodic acid, phosphoric acid, citric acid, benzoic acid, tartaric acid, maleic acid, and methanesulfonic acid.

The compound of Formula I and its physiologically acceptable acid addition salts are indicated for use as a pharmaceutical on their own or in the form of appropriate medicinal preparations for enteral or parenteral administration. In order to produce appropriate medicinal preparations the compounds are worked up with organic and inorganic adjuvants which are inert and physiologically acceptable. Examples of such adjuvants are:

*Tablets and dragées.*—Lactose, starch, talc and stearic acid.

*Powder.*—Inert substances such as talc, aerosil and magnesium stearate in small amounts.

In the following non-limitative examples, all temperatures are stated in degrees centigrade.

EXAMPLE 1

26.1 parts of 3-ethylmercapto-phenothiazine (melting point 95–97°), 4.7 parts of finely pulverized sodium amide and 120 parts by volume of absolute xylene are heated to boiling for two hours, under reflux and while stirring the reaction mixture, at an oil-bath temperature of 180°. Without interrupting the heating, a solution of 20.0 parts of 1 - methyl-4-(3'-chloropropyl-1')-piperazine (boiling point 95–97° at a pressure of 10 mm. Hg) in 20 parts by volume of xylene is added dropwise in the course of one and a half hours. After heating 3 more hours, the reaction mixture is cooled and 10.0 parts of ammonium chloride added; the mixture is then shaken out three times, using 50 parts by volume of water each time. The xylene solution is extracted with 250 parts by volume of aqueous tartaric acid of 15% strength, after which the tartaric acid extract is washed with 80 parts by volume of benzene and then rendered phenolphthalein-alkaline by the addition of 60 parts by volume of concentrated aqueous caustic soda solution. The base which precipitates is taken up in a total of 150 parts by volume of benzene; the benzene layer is dried over potassium carbonate and is then evaporated under reduced pressure. The residue from the evaporation is distilled in a high vacuum. After separating a preliminary distillate which passes over up to 226° under a pressure of 0.01 mm. Hg the main fraction—3 - ethylmercapto - 10 - [3'-(1''-methyl-piperazyl-4'')-propyl-1']-phenothiazine—which distils at 226–228° under the last-mentioned pressure is collected. The analytically pure base boils at 227° under a pressure of 0.01 mm. Hg and melts at 62–64°.

Upon the addition of ethanolic HCl to a solution, cooled to 0°, of 26.38 parts of the free base in 130 parts by volume of absolute ethanol, until a Congo-acid reaction is achieved, the crystalline dihydrochloride of 3-ethylmercapto - 10 - [3'-(1''-methyl-piperazyl-4'')-propyl-1']-phenothiazine is precipitated. The analytically pure salt has a melting point of 214–216° (bubbles); it begin to sinter at 205°. The dimaleate melts at 188–190° after sintering from 180° (recrystallized from methanol).

EXAMPLE 2

A solution of 207 parts of phosgene in 1000 parts by volume of toluene is added, all at one time, at ordinary temperature to a solution of 259 parts of 3-ethylmercapto-phenothiazine (M.P. 95–97°) in 750 parts by volume of benzene. The reaction mixture is heated to boiling in the course of one hour on a water-bath. After heating for three more hours under reflux, the solvent is evaporated under reduced pressure, and the residue from the evaporation is recrystallized from 470 parts by volume of boiling isopropanol. The obtained 3-ethyl-mercapto-phenothiazine-10-carboxylic acid chloride, in pure state, melts at 95–97°.

A mixture of 14.5 parts of 3-ethylmercapto-phenothiazine-10-carboxylic acid chloride (M.P. 95–97°), 14.5 parts of 1-methyl-4-(γ-hydroxypropyl)-piperazine (B.P. 115–118°/10 mm. Hg) and 200 parts by volume of benzene are heated to boiling under reflux for 15 hours at a bath temperature of 120°. After evaporation under reduced pressure and following the addition of 300 parts by volume of ether, the reaction mixture is shaken out with 70 parts by volume of water and twice with aqueous tartaric acid of 15% strength, using 150 parts by volume each time. The combined extracts are further washed with 200 parts by volume of ether, and are finally rendered alkaline to phenolphthalein with 75 parts by volume of concentrated aqueous caustic soda solution. The base which thereupon precipitates is taken up in 300 parts by volume of benzene, the benzene layer washed with 60 parts by volume of water, dried over sodium sulfate and evaporated under reduced pressure. The residue from the evaporation is dissolved in 20 parts by volume of isopropanol, after which isopropanolic hydrochloric acid is added until a Congo-acid reaction is realized. The hydrochloride which is thus precipitated is filtered off with suction and is rapidly recrystallized from 700 parts by volume of absolute ethanol. The analytically pure hydrochloride of 3-ethylmercapto-phenothiazine-10-carboxylic acid-[3'-(1''-methyl-piperazyl-4'')-propyl-1']-ester melts at 211–213° (decomposition) and contains ½ mol of water of crystallization.

4.95 parts of 3 - ethylmercapto-phenothiazine-10-carboxylic acid - [3' - (1''-methyl-piperazyl-4'')-propyl-1']-ester, obtained from the hydrochloride which melts at 211–213° (decomposition), are heated in an oil bath for 1 hour at 180° and then for 4 hours at 200° under a pressure of 12 mm. Hg. Under completion of the ensuing evolution of carbon dioxide, the residue is distilled in a high vacuum. After separating a preliminary distillate which passes over up to 226° under a pressure of 0.01 mm. Hg, the main fraction which distils at 226–228° under the same pressure is collected; it is the 3-ethylmercapto - 10 - [3' - (1'' - methyl-piperazyl-4'')-propyl-1']-phenothiazine. The analytically pure base boils at 227° under a pressure of 0.01 mm. Hg, and melts at 62–64°. It forms a hydrochloride which melts at 214–216° (decomposition), after sintering beginning at 205°, and it forms a dimaleate which melts at 188–190° (decomposition) after sintering from 180°. The two salts are identical with the hydrochloride and dimaleate prepared according to Example 1 and show no melting point depression in admixture therewith. 3 - ethylmercapto - phenothiazine, which is used as a starting material, is prepared in the following way:

N - (m - ethylmercapto-phenyl)-aniline (boiling point 140°/0.007 mm. Hg) is prepared by condensing m-ethylmercapto-aniline (boiling point 147–152°/10 mm. Hg) with the potassium salt of o-chloro-benzoic acid, and decarboxylating the resultant N-(m-ethylmercapto-phenyl)-anthranilic acid (melting point 114–116°) by heating, and then distilling.

5.39 parts of N-(m-ethylmercapto-phenyl)-aniline are heated with 1.51 parts of sulfur and 0.1 part of powdered iodine for 12 minutes in a bath at about 160°. Upon termination of the ensuing hydrogen sulfide evolution, animal charcoal is added to the reaction mixture which is then first recrystallized from 15 parts by volume of chlorobenzene. The crystals are then dissolved in 12 parts by volume of boiling benzene, and 12 parts by volume of petroleum ether are then added to the warm solution, whereupon 3-ethylmercapto-phenothiazine is obtained as a weakly yellow-colored crystalline substance which melts at 95–97°.

We claim:

1. A compound selected from the group consisting of

3 - ethylmercapto - 10 - [3' - (1''-methyl-piperazyl-4'')-propyl-1']-phenothiazine and its physiologically acceptable acid addition salts.

2. 3 - ethylmercapto-10-[3'-(1''-methyl-piperazyl-4'')-propyl-1']-phenothiazine.

3. 3 - ethylmercapto-10-[3'-(1''-methyl-piperazyl-4'')-propyl-1']-phenothiazine dimaleate.

4. An enterally or parenterally administerable pharmaceutical composition consisting essentially of a therapeutically effective amount of a selectively anti-emetic compound claimed in claim 1 and a pharmaceutically acceptable non-toxic, inert carrier.

References Cited

UNITED STATES PATENTS

| | | | |
|---|---|---|---|
| 2,928,767 | 3/1960 | Gulesich et al. | 260—243 X |
| 3,176,015 | 3/1965 | Jacob et al. | 260—243 |

JOHN D. RANDOLPH, *Primary Examiner.*

WALTER A. MODANCE, *Examiner.*